(12) United States Patent
Maekawa

(10) Patent No.: US 12,436,192 B2
(45) Date of Patent: Oct. 7, 2025

(54) SEMICONDUCTOR INTEGRATED CIRCUIT AND TEST METHOD FOR SEMICONDUCTOR INTEGRATED CIRCUIT

(71) Applicants: Kabushiki Kaisha Toshiba, Tokyo (JP); Toshiba Electronic Devices & Storage Corporation, Tokyo (JP)

(72) Inventor: Tomoyuki Maekawa, Fujisawa Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 217 days.

(21) Appl. No.: 18/244,162

(22) Filed: Sep. 8, 2023

(65) Prior Publication Data

US 2024/0329132 A1 Oct. 3, 2024

(30) Foreign Application Priority Data

Mar. 27, 2023 (JP) ................................ 2023-049571

(51) Int. Cl.
 *G01R 31/317* (2006.01)
 *G01R 31/3185* (2006.01)

(52) U.S. Cl.
 CPC ........... *G01R 31/318552* (2013.01); *G01R 31/31727* (2013.01)

(58) Field of Classification Search
 CPC ...... G01R 31/31727; G01R 31/318552; G01R 31/2851
 See application file for complete search history.

(56) References Cited

U.S. PATENT DOCUMENTS 6,442,722 B1 * 8/2002 Nadeau-Dostie ........................ G01R 31/31858 714/731
6,861,867 B2 * 3/2005 West .............. G01R 31/318594 326/46

(Continued)

FOREIGN PATENT DOCUMENTS

JP 4272898 B2 6/2009
JP 2010-038874 A 2/2010

(Continued)

OTHER PUBLICATIONS

S. Wu et al., "Logic BIST Architecture Using Staggered Launch-on-Shift for Testing Designs Containing Asynchronous Clock Domains," 2010 IEEE 25th International Symposium on Defect and Fault Tolerance in VLSI Systems, Kyoto, Japan, 2010, pp. 358-366, (Year: 2010).*

(Continued)

*Primary Examiner* — Cynthia Britt
(74) *Attorney, Agent, or Firm* — Kim & Stewart LLP

(57) ABSTRACT

According to one embodiment, a circuit includes: a core circuit including first and second scan layers; and a test control circuit that controls a scan test on the first and second scan layers. The test control circuit supplies a first test data and a first shift clock to the first scan layer and then sets the first scan layer to a waiting state, supplies a second test data and a second shift clock to the second scan layer during a period in which the first scan layer is in the waiting state, sets the second scan layer to a waiting state after supplying the second test data and the second shift clock to the second scan layer, and supplies a first launch clock and a first capture clock to the first scan layer after setting the second scan layer to the waiting state.

20 Claims, 5 Drawing Sheets

(56) References Cited

U.S. PATENT DOCUMENTS

| | | | | |
|---|---|---|---|---|
| 7,424,656 B2* | 9/2008 | Nadeau-Dostie | ............................. | G01R 31/31858 |
| | | | | 714/724 |
| 7,793,179 B2* | 9/2010 | Sul | ................. | G01R 31/318594 |
| | | | | 714/731 |
| 10,401,430 B2 | 9/2019 | Maekawa | | |
| 2006/0179376 A1* | 8/2006 | Asaka | ............... | G01R 31/31858 |
| | | | | 714/731 |
| 2006/0242449 A1* | 10/2006 | Frederick | ......... | G01R 31/31727 |
| | | | | 713/600 |
| 2009/0125769 A1* | 5/2009 | Nguyen | .................. | G11C 29/56 |
| | | | | 714/E11.155 |
| 2012/0102376 A1* | 4/2012 | Shtulman | ....... | G01R 31/318594 |
| | | | | 714/E11.02 |

FOREIGN PATENT DOCUMENTS

| | | |
|---|---|---|
| JP | 4951304 B2 | 6/2012 |
| JP | 2018-155707 A | 10/2018 |
| JP | 2020-034287 A | 3/2020 |

OTHER PUBLICATIONS

S.-L. Hong and K.-J. Lee, "A run-pause-resume silicon debug technique for multiple clock domain systems," 2017 International Test Conference in Asia (ITC-Asia), Taipei, Taiwan, 2017, pp. 46-51, (Year: 2017).*

* cited by examiner

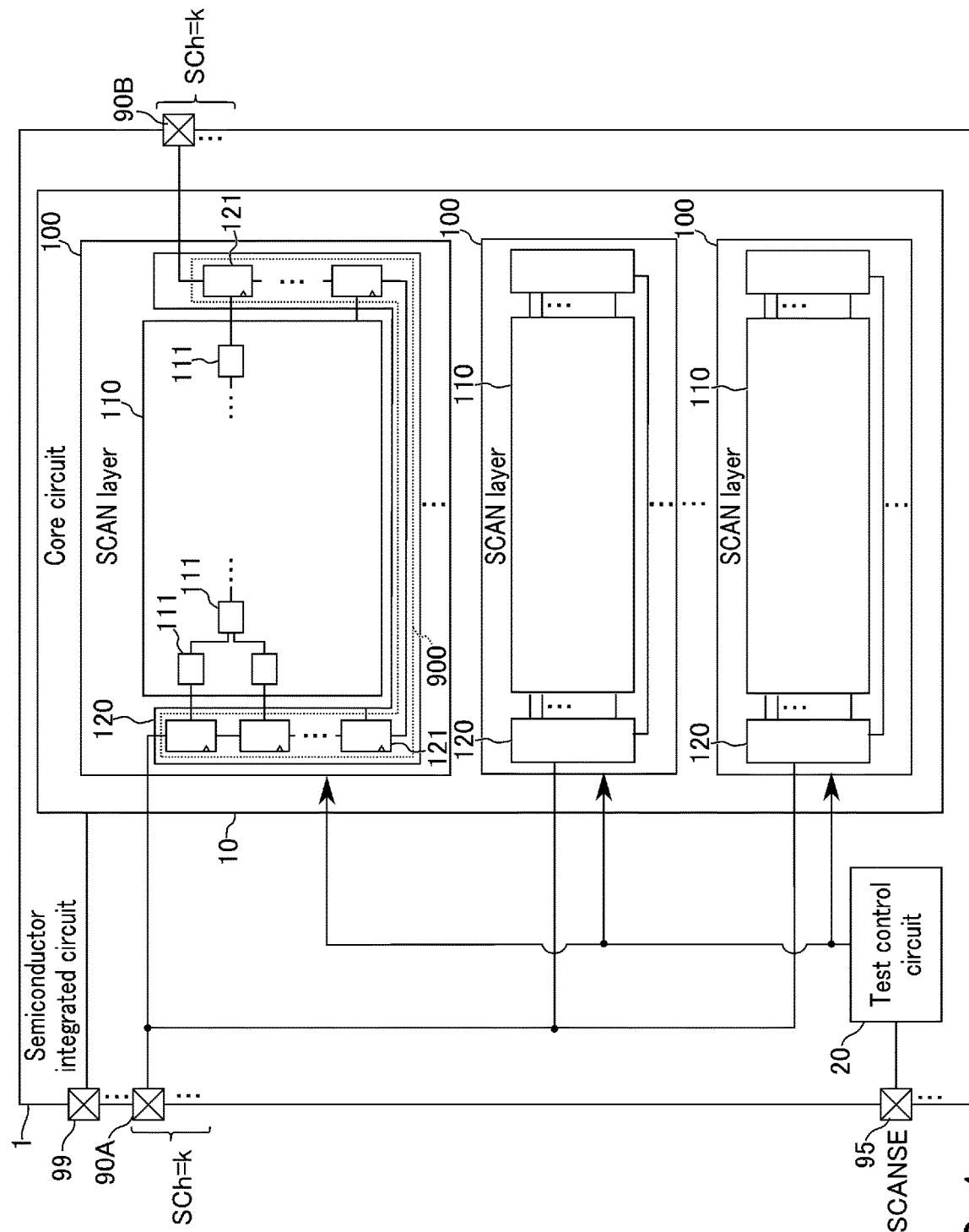
F I G. 1

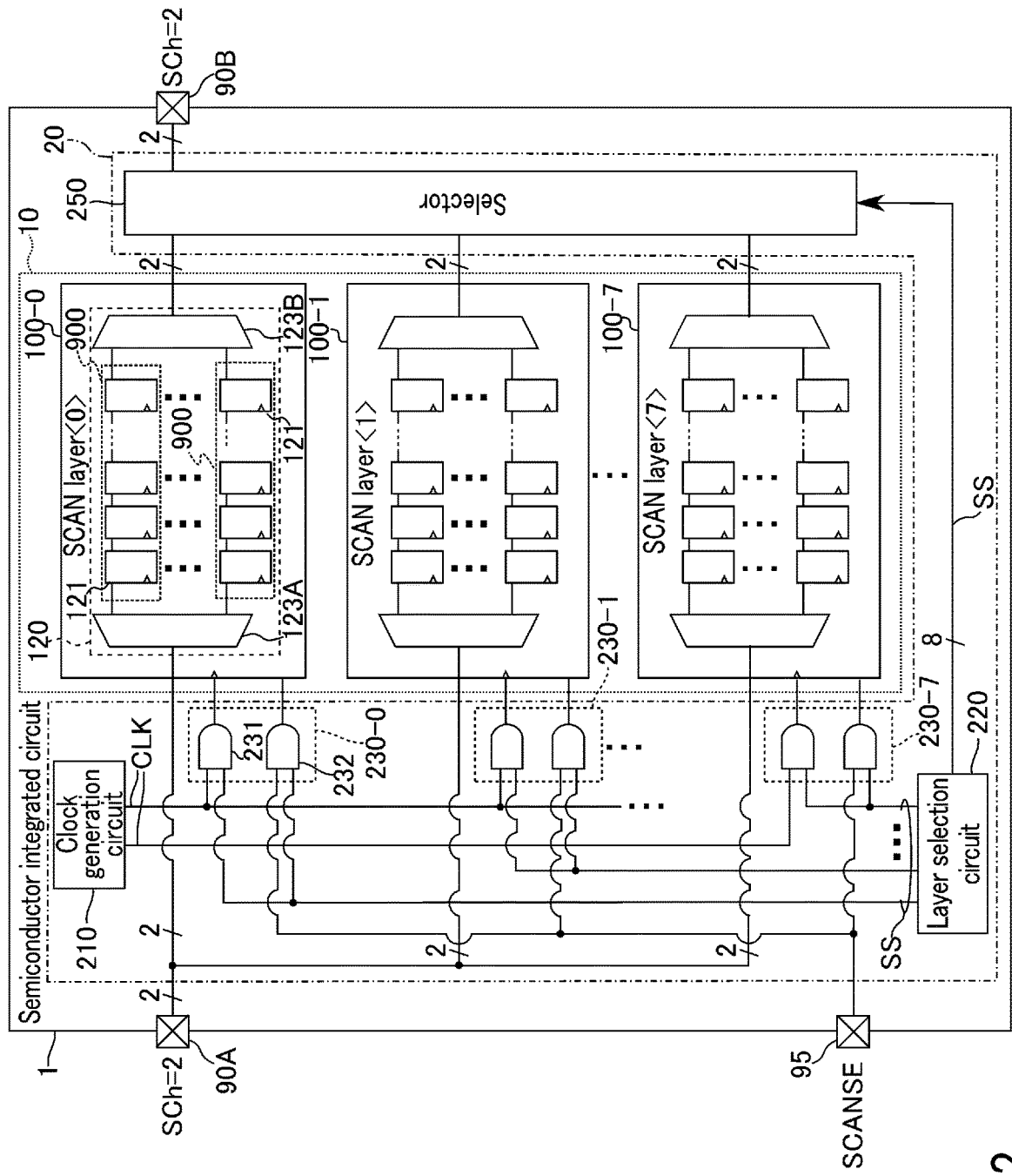
F I G. 2

SEMICONDUCTOR INTEGRATED CIRCUIT AND TEST METHOD FOR SEMICONDUCTOR INTEGRATED CIRCUIT

CROSS-REFERENCE TO RELATED APPLICATIONS

This application is based upon and claims the benefit of priority from Japanese Patent Application No. 2023-049571, filed Mar. 27, 2023, the entire contents of which are incorporated herein by reference.

FIELD

Embodiments described herein relate generally to a semiconductor integrated circuit and a test method for a semiconductor integrated circuit.

BACKGROUND

A scan test is used for testing on a semiconductor integrated circuit.

BRIEF DESCRIPTION OF THE DRAWINGS

FIG. 1 is a diagram showing a configuration example of a semiconductor integrated circuit of an embodiment.

FIG. 2 is a diagram schematically showing a configuration example of a test control circuit of the semiconductor integrated circuit of the embodiment.

DETAILED DESCRIPTION

Figure 3:
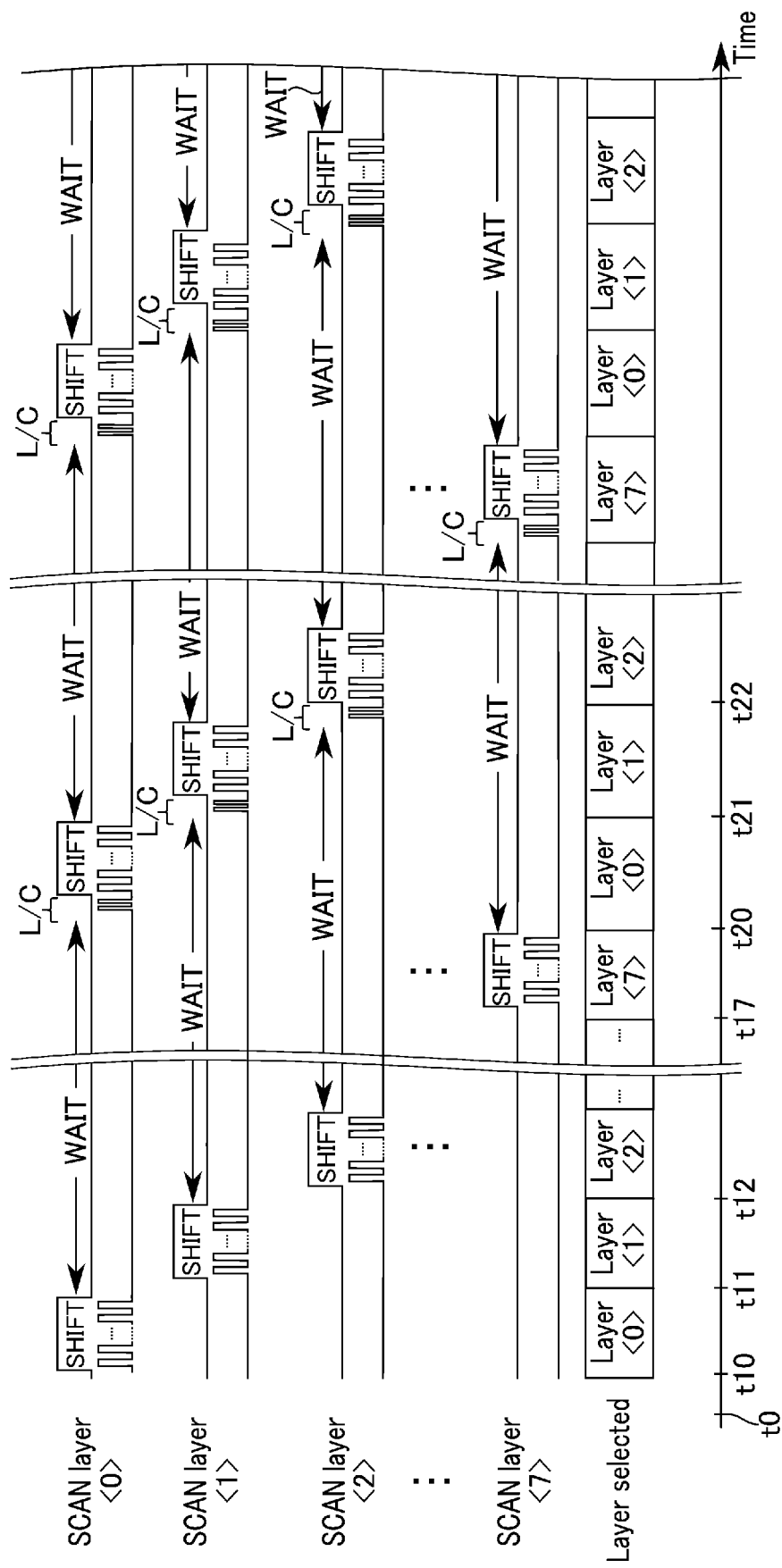
FIG. 3 is a timing chart for describing a test method for a semiconductor integrated circuit of the embodiment.

A semiconductor integrated circuit and a test method (control method) for a semiconductor integrated circuit of an embodiment will now be described with reference to FIGS. 1 to 5. In the following description, elements having the same function and configuration are denoted by the same reference signs. Further, in each of the following embodiments, in a case where constitutional elements (for example, circuits, wires, various voltages and signals, etc.) marked with reference signs in which numerals/English letters for distinction are provided at the ends do not need to be distinguished from each other, a mark (reference sign) in which the numeral/English letter at the end is omitted is used.

In general, according to one embodiment, a semiconductor integrated circuit includes: a core circuit including a first scan layer and a second scan layer, the first scan layer including a first scan chain circuit and a first combinational circuit, the second scan layer including a second scan chain circuit and a second combinational circuit; and a test control circuit that controls a scan test on the first and second scan layers; wherein the test control circuit supplies a first piece of test data and a first shift clock to the first scan layer and then sets the first scan layer to a waiting state, supplies a second piece of test data and a second shift clock to the second scan layer during a period in which the first scan layer is in the waiting state, sets the second scan layer to a waiting state after supplying the second piece of test data and the second shift clock to the second scan layer, and supplies a first launch clock and a first capture clock to the first scan layer after setting the second scan layer to the waiting state.

EMBODIMENT

(1) Configuration Example

A configuration example of a semiconductor integrated circuit of an embodiment will now be described with reference to FIGS. 1 and 2.

FIG. 1 is a block diagram for describing a configuration example of a semiconductor integrated circuit of the present embodiment.

A semiconductor integrated circuit 1 of FIG. 1 is, for example, a processor, a controller, a memory, a sensor, a power supply circuit, an ASIC (application specific integrated circuit), a system LSI, or the like.

As shown in FIG. 1, the semiconductor integrated circuit 1 of the present embodiment includes a core circuit 10 and a test control circuit 20.

The core circuit 10 implements desired calculation processing, desired signal processing, desired operation sequences, desired functions, etc. of the semiconductor integrated circuit 1. The core circuit 10 communicates with other devices via a plurality of terminals (pins, pads, and connectors) 99 provided on a chip (semiconductor chip) of the semiconductor integrated circuit 1. Signals and data for executing desired processing of the core circuit 10 and signals and data according to results of processing are inputted and outputted via the terminals 99.

The core circuit 10 includes a plurality of combinational circuits 110 and a plurality of scan chain circuits 120.

The combinational circuit 110 includes a plurality of circuit elements 111. The combinational circuit 110 uses a combination of circuit elements 111 to execute desired calculation processing, desired signal processing, desired operation sequences, and desired functions. The circuit element 111 is a logic gate. However, the circuit element 111 can include a memory element and/or a passive element, etc.

The scan chain circuit (also referred to as a testing flip-flop circuit) 120 is provided in the core circuit 10 for DFT (design for testability). However, the scan chain circuit 120 may be regarded as a part of the test control circuit 20.

The scan chain circuit 120 is used for a scan test. The scan chain circuit 120 includes a plurality of flip-flops 121 for a scan test. In the flip-flops 121, transmission paths of signals regarding input and output of test data of the flip-flops 121 are connected in series. In the present embodiment, a set 900 of flip-flops 121 connected in series is referred to as a scan chain 900. In the present embodiment, the flip-flop 121 is also referred to as a scan flip-flop 121.

For example, the scan flip-flop 121 is configured to be controllable from the outside of the semiconductor integrated circuit 1. The scan flip-flop 121 is configured such that the data holding state of the scan flip-flop 121 can be observed from the outside of the semiconductor integrated circuit 1.

Test data used for a scan test of the semiconductor integrated circuit 1 is inputted to one end of the scan chain 900 or the other end of the scan chain 900. During a scan test operation, test data is supplied to a flip-flop 121 on the test data input side of the scan chain 900. A signal according to the test data is transferred from a flip-flop 121 on the test data input side to a flip-flop 121 on the test result output side via circuit elements 111 forming the combinational circuit 110.

Test data and data indicating a test result are inputted to the semiconductor integrated circuit 1 from a test apparatus (not illustrated) outside the semiconductor integrated circuit 1 or outputted from the semiconductor integrated circuit 1 to the test apparatus via terminals (pins, pads, and connectors) 90A and 90B provided on the chip of the semiconductor integrated circuit 1. In a case where the number of scan channels (test channels) SCh of the semiconductor integrated circuit 1 is k, k terminals 90A and k terminals 90B are provided on the chip of the semiconductor integrated circuit 1. k is an integer of 1 or more. For example, the number (k) of scan channels of the semiconductor integrated circuit 1 is set based on the number (m) of scan layers in the semiconductor integrated circuit 1 and the number (n) of channels of the test apparatus. m and n are each an integer of 2 or more.

The test control circuit 20 controls execution of test processing on the core circuit 10. The test control circuit 20 performs, for example, control for a scan test at an actual operation speed (At-speed) on the core circuit 10. The test control circuit 20 controls various operations for a scan test during the scan test. The test control circuit 20 supplies, to the core circuit 10, various signals for a scan test, such as a shift clock, a launch clock, and a capture clock.

For example, the test control circuit 20 is connected to the test apparatus via a plurality of terminals 95 provided on the chip of the semiconductor integrated circuit 1. For example, a control signal (hereinafter, also referred to as an enable signal) SCANSE indicating execution of a scan test is suppled via the terminal 95. During a test operation, the semiconductor integrated circuit 1 can communicate with the test apparatus via the terminals 95.

In the semiconductor integrated circuit 1 of the present embodiment, the core circuit 10 includes a plurality of scan layers 100. The scan layer 100 is a region obtained by logically dividing the core circuit 10 such that a scan test can be independently executed in certain units of circuit regions (layers).

For example, the core circuit 10 is divided into a plurality of scan layers 100 each having a certain circuit scale according to a clock system to which the combinational circuit 110 is connected, the number of circuit elements (for example, logic gates) 111 constituting the combinational circuit 110, the area of the combinational circuit 110, the function of the combinational circuit 110, etc.

In a case where k scan channels SCh are provided on the chip of the semiconductor integrated circuit 1, each scan layer 100 has k scan channels (hereinafter, also referred to as internal scan channels).

By a plurality of scan layers 100 being provided in the core circuit 10 of the semiconductor integrated circuit 1 as in the present embodiment, an improvement in the reliability of the test of the semiconductor integrated circuit 1, an improvement in the efficiency of the test of the semiconductor integrated circuit 1, stabilization of the test, a reduction in the power consumption of the test, etc. can be achieved.

FIG. 2 is a diagram for more specifically describing internal configurations of the scan layer 100 (100-0, 100-1, . . . , 100-7) and the test control circuit 20 of the semiconductor integrated circuit 1 of the present embodiment.

As shown in FIG. 2, for example, eight scan layers 100-0, 100-1, . . . , 100-7 are provided in the core circuit 10.

In a case where a scan test of a compression scan scheme is executed, each scan layer 100 includes a scan chain circuit 120 including a plurality of (for example, i) scan chains 900. i is an integer of 2 or more. For example, in each scan chain circuit 120, one scan chain 900 includes several hundred scan flip-flops 121.

The number of scan flip-flops 121 in the scan chain circuit 120 may vary between scan layers 100. Further, the number of scan flip-flops 121 in the scan chain 900 may vary between scan layers 100.

In each scan layer 100, two decompression/compression circuits 123 (123A and 123B) are provided. One decompression/compression circuit 123A is connected to one ends of the scan chains 900. The other decompression/compression circuit 123B is connected to the other ends of the scan chains 900. The scan chains 900 are connected in parallel between the two decompression/compression circuits 123.

Of the two decompression/compression circuits 123A and 123B, a circuit (for example, circuit 123A) on a side where test data is inputted (a scan-in side, or a launch side) functions as a decompression circuit, and a circuit (for example, 123B) on a side where a test result with respect to test data is outputted (a scan-out side, or a capture side) functions as a compression circuit.

The decompression circuit 123 performs decompression transformation on inputted test data. The decompression circuit 123 supplies test data subjected to decompression transformation to the scan chains 900.

The compression circuit 123 performs compression transformation on data indicating test results from the scan chains 900. The compression circuit 123 outputs data subjected to compression transformation to a circuit in a later stage as data indicating a result of a scan test of the combinational circuit 110.

For example, the decompression/compression circuit 123 is configured to be observable and controllable from the outside of the semiconductor integrated circuit 1.

In a case where a scan test of a compression test scheme is executed, the scan chain of the scan chain circuit 120 for a certain combinational circuit 110 is divided into i pieces. Thereby, the number of scan flip-flops 121 in one scan chain 900 is reduced. As a result, the time of the scan test can be shortened.

The test control circuit 20 includes a clock generation circuit 210, a layer selection circuit 220, a plurality of mask control circuits 230 (230-0, 230-1, . . . , 230-7), and a selector 250.

The clock generation circuit 210 generates various clocks CLK used for a scan test, such as a shift clock, a launch clock, and a capture clock. The clock generation circuit 210 outputs generated various clocks CLK to a corresponding clock system among one or more clock systems. Outputted clock CLK are, for example, supplied to a scan layer 100 selected as a test target via the mask control circuit 230.

By the shift clock, the supplied test data is shifted between scan flip-flops 121. By the launch clock, the supplied test data is stored in a scan flip-flop 121, and is inputted to the combinational circuit 110. By the capture clock, a signal outputted from the combinational circuit 110 according to the supplied test data is stored in a scan flip-flop 121.

For example, in a case where some of the scan layers 100 belong to different clock systems, the scan layers 100 are connected to the clock generation circuit 210 via different clock signal lines. For example, scan layer 100-7 is connected to the clock generation circuit 210 via a clock signal line different from the clock signal line to which scan layers 100-0 and 100-1 are connected. Thereby, scan layer 100-7 can receive clocks CLK of a clock system different from that of the other scan layers 100-0 and 100-1.

The layer selection circuit 220 selects one of the scan layers 100 as a target (hereinafter, also referred to as a test target) of input/output of data and signals regarding a test operation. The layer selection circuit 220 supplies a selection signal (control signal) SS indicating that the corresponding scan layer 100 is a test target to the mask control circuit 230 corresponding to the scan layer 100 of the test target. Thereby, the scan layer 100 of the test target is set to a state where data and signals can be inputted and outputted. The layer selection circuit 220 supplies a selection signal SS to the selector 250.

Each of the selection signals SS is supplied to a corresponding one of the mask control circuits 230. For example, a selection signal SS at an "H" level is supplied to a mask control circuit 230 corresponding to a scan layer 100 of a test target. By the selection signal SS at the "H" level, the scan layer 100 of the test target is set to a selected state. Selection signals SS at an "L" level are supplied to the scan layers 100 other than the scan layer 100 of the test target. By the selection signals SS at the "L" level, the scan layers 100 other than the scan layer 100 of the test target are set to a mask state (non-selected state, blocked state, or waiting state).

The selection of the scan layer 100 by the layer selection circuit 220 may be executed based on a selection signal SS generated by the test control circuit 20, or may be executed based on a control signal from a test apparatus (not illustrated) outside the semiconductor integrated circuit 1.

Mask control circuits (also referred to as input blocking circuits) 230-0, 230-1, . . . , 230-7 are provided to correspond to scan layers 100-0, 100-1, 100-7, respectively. The mask control circuit 230 receives clocks CLK from the clock generation circuit 210, a selection signal SS from the layer selection circuit 220, and an enable signal SCANSE. The mask control circuit 230 supplies clocks CLK to the scan layer 100 selected as a test target based on the selection signal SS and the enable signal SCANSE. Based on the selection signal SS and the enable signal SCANSE, the mask control circuit 230 blocks signals for the scan layer 100 of the test target from being inputted to the scan layers 100 other than the scan layer 100 of the test target.

The mask control circuit 230 includes two AND gates 231 and 232.

One input terminal of AND gate 231 is connected to the clock generation circuit 210. The one input terminal of AND gate 231 receives clocks CLK from the clock generation circuit 210. The other input terminal of AND gate 231 is connected to the layer selection circuit 220. The other input terminal of AND gate 231 receives a selection signal SS at the "H" level or the "L" level from the layer selection circuit 220. An output terminal of AND gate 231 is connected to a clock input terminal of the scan layer 100.

AND gate 231 executes an AND operation of the clock CLK and the selection signal SS. AND gate 231 outputs a signal indicating a result of an AND operation of the clock CLK and the selection signal SS. In a case where the selection signal SS is at the "H" level, AND gate 231 outputs a signal in phase with the clock CLK to the corresponding scan layer 100. Therefore, the clock CLK is supplied to the selected scan layer 100. In a case where the selection signal SS is at the "L" level, AND gate 231 outputs a signal at the "L" level to the corresponding scan layer 100. As a result, the clock CLK is not supplied to the corresponding scan layer (a scan layer in the non-selected state) 100.

One input terminal of AND gate 232 is connected to a terminal 95 to which an enable signal SCANSE is supplied. The one input terminal of AND gate 232 receives an enable signal SCANSE. The other input terminal of AND gate 232 is connected to the layer selection circuit 220. The other input terminal of AND gate 232 receives a selection signal SS. An output terminal of AND gate 232 is connected to a control terminal of the scan layer 100.

AND gate 232 executes an AND operation of the enable signal SCANSE and the selection signal SS. AND gate 232 outputs a signal indicating a result of an AND operation of the enable signal SCANSE and the selection signal SS. For example, in a case where the signal level of the enable signal SCANSE is at the "H" level and the signal level of the selection signal SS is at the "H" level, AND gate 232 outputs a signal at the "H" level to the corresponding scan layer 100. Thereby, the corresponding scan layer 100 is set to the selected state. For example, regardless of the signal level of the enable signal SCANSE, in a case where the signal level of the selection signal SS is at the "L" level, AND gate 232 outputs a signal at the "L" level to the corresponding scan layer 100. Thereby, the corresponding scan layer 100 is set to the mask state (non-selected state). The enable signal SCANSE at the "L" level indicates that a test is not to be executed.

In a case where the corresponding scan layer 100 is not selected, AND gates 231 and 232 of each mask control circuit 230 block signals for a selected scan layer 100 from being inputted to the corresponding scan layer 100.

The selector 250 receives a plurality of selection signals SS from the layer selection circuit 220. The selector 250 selects a scan layer 100 of a test target among the scan layers 100 based on the selection signals SS supplied from the layer selection circuit 220. Thereby, a signal (data) outputted from the scan layer 100 selected by the selector 250 is supplied to the test apparatus via the testing terminal 90B. A test result (the presence or absence of a failure) of the selected scan layer 100 is verified with the supplied signal.

For example, in a case where two scan channels SCh are provided on the semiconductor integrated circuit 1, two scan channels are allocated to each scan layer 100. Test data is supplied to the scan layer 100 via the scan channel SCh based on timing synchronized with the shift clock.

In the present embodiment, by the configuration of FIG. 2, control for a test can be executed on the scan layers 100 included in the semiconductor integrated circuit 1 independently of each other.

(2) Test Method

A test method (control method) for the semiconductor integrated circuit 1 of the present embodiment will now be described with reference to FIGS. 3 to 5.

(a) Basic Example

FIG. 3 is a schematic diagram for describing a basic example (concept) of a test method for the semiconductor integrated circuit 1 of the present embodiment.

As shown in FIG. 3, in a test method (test operation) for the semiconductor integrated circuit 1 of the present embodiment, a test (for example, a scan test) of the core circuit 10 is executed on the scan layers 100 independently of each other. In other words, the test of the core circuit 10 is executed on each scan layer 100 in a time division manner.

At time to, a test operation on the semiconductor integrated circuit 1 of the present embodiment is started. During the test operation on the semiconductor integrated circuit 1 of the present embodiment, test data of a certain test pattern is supplied from the test apparatus to the semiconductor integrated circuit 1 via two scan channels SCh.

In a case where a scan test is executed on a first scan layer <0> 100-0 among eight scan layers <0>, <1>, <2>, ..., <7>, 100-0, 100-1, 100-2, ..., 100-7, a second scan layer <1> 100-1 to an eighth scan layer <7> 100-7 are set to the mask state (non-selected state, blocked state, or waiting state).

At time t10, the first scan layer <0> 100-0 is set to the selected state by the layer selection circuit 220 and the mask control circuit 230-0. The second scan layer <1> 100-1 to the eighth scan layer <7> 100-7 are set to the mask state by the layer selection circuit 220 and the mask control circuits 230-1, ... 230-7.

Test data of a certain test pattern is inputted to the scan chain circuit 120 of the selected scan layer <0> 100-0 via two scan channels (internal scan channels) of the first scan layer 100-0 by a shift operation (SHIFT) synchronized with a shift clock from the clock generation circuit 210.

After the input of test data, the selected scan layer <0> 100-0 is set to the waiting state (WAIT) by the layer selection circuit 220 and the mask control circuit 230 before a launch operation (supply of a launch clock) and a capture operation (supply of a capture clock). Thereby, the scan layer <0> 100-0 after the shift operation is allowed to stand for a certain period of time in a state where data is inputted to each scan flip-flop 121 of the scan chain circuit 120.

At time t11, after the first scan layer <0> 100-0 with test data inputted thereto is set to the waiting state, the second scan layer <1> 100-1 is set to the selected state by the layer selection circuit 220 and the mask control circuit 230. The third scan layer <2> 100-2 to the eighth scan layer <7> 100-7 are set to the mask state by the layer selection circuit 220 and the mask control circuit 230.

Thereby, a shift operation for inputting test data is executed on the selected second scan layer <1> 100-1 according to a shift clock from the clock generation circuit 210. At this time, the first scan layer <0> 100-0 continues holding of data in the scan chain circuit 120 by the waiting state.

For example, the test pattern of test data inputted to the second scan layer <1> 100-1 is different from the test pattern of test data inputted to the first scan layer <0> 100-0. In a case where the clock system of the second scan layer <1> 100-1 is different from the clock system of the first scan layer <0> 100-0, the shift clock for the second scan layer <1> 100-1 may be different from the shift clock for the first scan layer <0> 100-0.

After the input of test data, similarly to the first scan layer <0> 100-0, the second scan layer <1> 100-1 is set to the waiting state in a period before a launch operation and a capture operation.

After that, at time t12 to time t17, the third scan layer <2> 100-2 to the eighth scan layer <7> 100-7 are sequentially set to the selected state at different timings by the layer selection circuit 220 and the mask control circuit 230. The inputs of test data by shift operations are sequentially executed on the scan layers 100 set to the selected state. The scan layer 100 with test data inputted thereto is set to the waiting state in a period before a launch operation and a capture operation.

At time t20, after the shift operation on the eighth scan layer <7> 100-7, the first scan layer <0> 100-0 in the waiting state is selected by the layer selection circuit 220 and the mask control circuit 230. The state of the first scan layer <0> 100-0 transitions from the waiting state to the selected state. The scan layers <1>, ..., <7>, 100-1, ..., 100-7 other than the first scan layer <0> 100-0 are maintained in the waiting state.

A launch operation and a capture operation (L/C) for a scan test at an actual operation speed are executed on the first scan layer <0> (a scan layer after the waiting state) 100-0 set to the selected state. A launch clock and a shift clock are supplied from the clock generation circuit 210 to the first scan layer <0> 100-0 in the selected state.

With the launch clock, a scan flip-flop 121 of the first scan layer <0> 100-0 in the selected state stores test data from the decompression circuit 123A. Thereby, the test data is supplied from the flip-flop 121 to the combinational circuit 110.

With the capture clock, an output signal from the combinational circuit 110 according to the supplied test data is supplied to a flip-flop 121. The output signal from the combinational circuit 110 is stored in the flip-flop 121. Thereby, a test result of the combinational circuit 110 belonging to the first scan layer 100 is acquired. The flip-flop 121 outputs the stored data to the compression circuit 123B. The data stored in the flip-flop 121 by means of the capture clock is supplied to the test apparatus via the compression circuit 123B and the selector 250 as a result of the scan test of the first scan layer <0>.

By a shift operation (supply of a shift clock) after the supply of a capture clock, input of test data and output of a test result are executed simultaneously.

The test apparatus compares the data supplied from the first scan layer <0> 100 of the semiconductor integrated circuit 1 with expected value data having a certain data pattern. The expected value data is data having a data pattern obtained from an output signal of the combinational circuit 110 according to supplied test data in a case where the combinational circuit 110 does not include a failure. Thereby, the presence or absence of a failure of the first scan layer <0> 100-0 with respect to test data of a certain test pattern is verified.

After the supply of a launch clock and a capture clock to the first scan layer <0> 100-0, test data of a new test pattern is supplied to the first scan layer <0> 100-0 in the selected state by a shift operation synchronized with a shift clock.

During the period in which the new test data is inputted to the first scan layer <0> (100-0), the other scan layers (100-1, ..., 100-7) in the mask state are set to the waiting state.

After the input of test data, the first scan layer <0> 100-0 is set to the waiting state.

At time t21, after the first scan layer <0> 100-0 is set to the waiting state, the second scan layer <1> 100-1 is set to the selected state by the layer selection circuit 220 and the mask control circuit 230.

Like in the test operation on the first scan layer <0> 100-0, a launch operation based on a launch clock and a capture operation based on a capture clock are executed on the second scan layer <1> 100-1 set to the selected state.

Thereby, a test result of the second scan layer <1> 100-1 with respect to test data is acquired. Data indicating the test result of the scan layer <1> 100-1 is supplied to the test apparatus via the selector 250. The presence or absence of a failure of the second scan layer 100-1 is detected.

After that, on or after time t22, by similar operations to the operations on the first and second scan layers 100-0 and 100-1, launch operations, capture operations, and second rounds of shift operations on the third scan layer <2> 100-2 to the eighth scan layer <7> 100-7 are sequentially executed one scan layer 100 after another.

As hereinabove, in the test method for the semiconductor integrated circuit 1 of the present embodiment, various operations for a scan test are executed in parallel (in a time division manner) on each of the scan layers 100.

In the test method for the semiconductor integrated circuit 1 of the present embodiment, in a period after a shift operation (input of test data) on a scan layer 100 and before the execution of a launch/capture operation, the scan layer 100 is set to the waiting state in parallel with shift operations on the other scan layers 100.

Thereby, in the test method for the semiconductor integrated circuit 1 of the present embodiment, a failure of the combinational circuit 110 that occurs in a case where the data holding state in the scan chain circuit 120 (the scan flip-flop 121) lasts for a long period of time can be detected.

As a result, the test method for the semiconductor integrated circuit 1 of the present embodiment can improve the reliability of the test on the semiconductor integrated circuit.

(b) Operation Example

A test method for the semiconductor integrated circuit 1 of the present embodiment will now be described with reference to FIGS. 4 and 5. FIG. 4 is a flowchart showing a test method for the semiconductor integrated circuit 1 of the present embodiment. FIG. 5 is a schematic diagram for describing the test method for the semiconductor integrated circuit 1 of the present embodiment. Herein, also FIGS. 1 to 3 can be referred to as appropriate in the description of the test method for the semiconductor integrated circuit 1 of the present embodiment.

Figure 4:
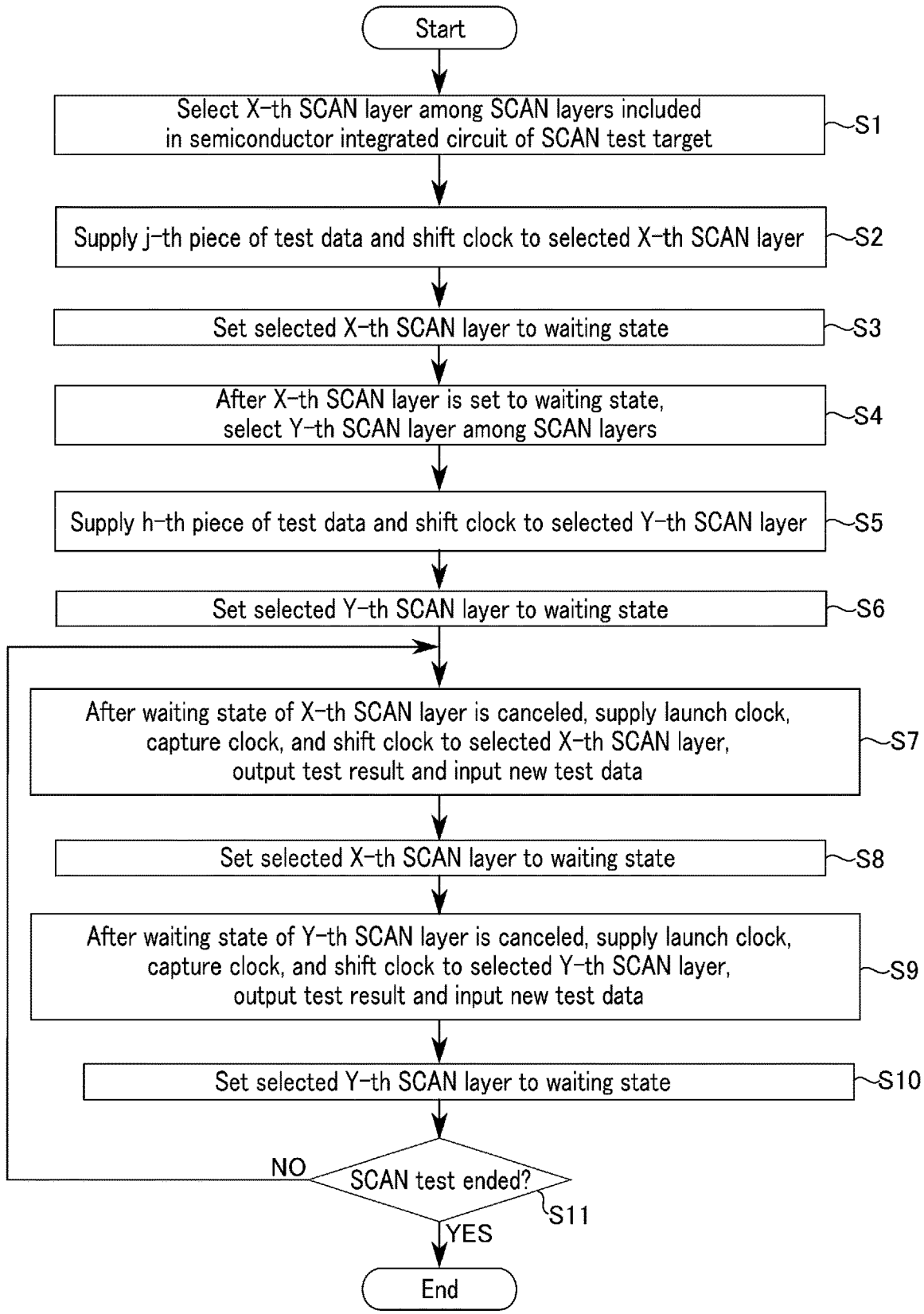
FIG. 4 is a flowchart for describing a test method for a semiconductor integrated circuit of the embodiment.

As shown in FIG. 4, a test operation (for example, a scan test) on the semiconductor integrated circuit 1 is started based on the test method for the semiconductor integrated circuit 1 of the present embodiment.

Figure 5:
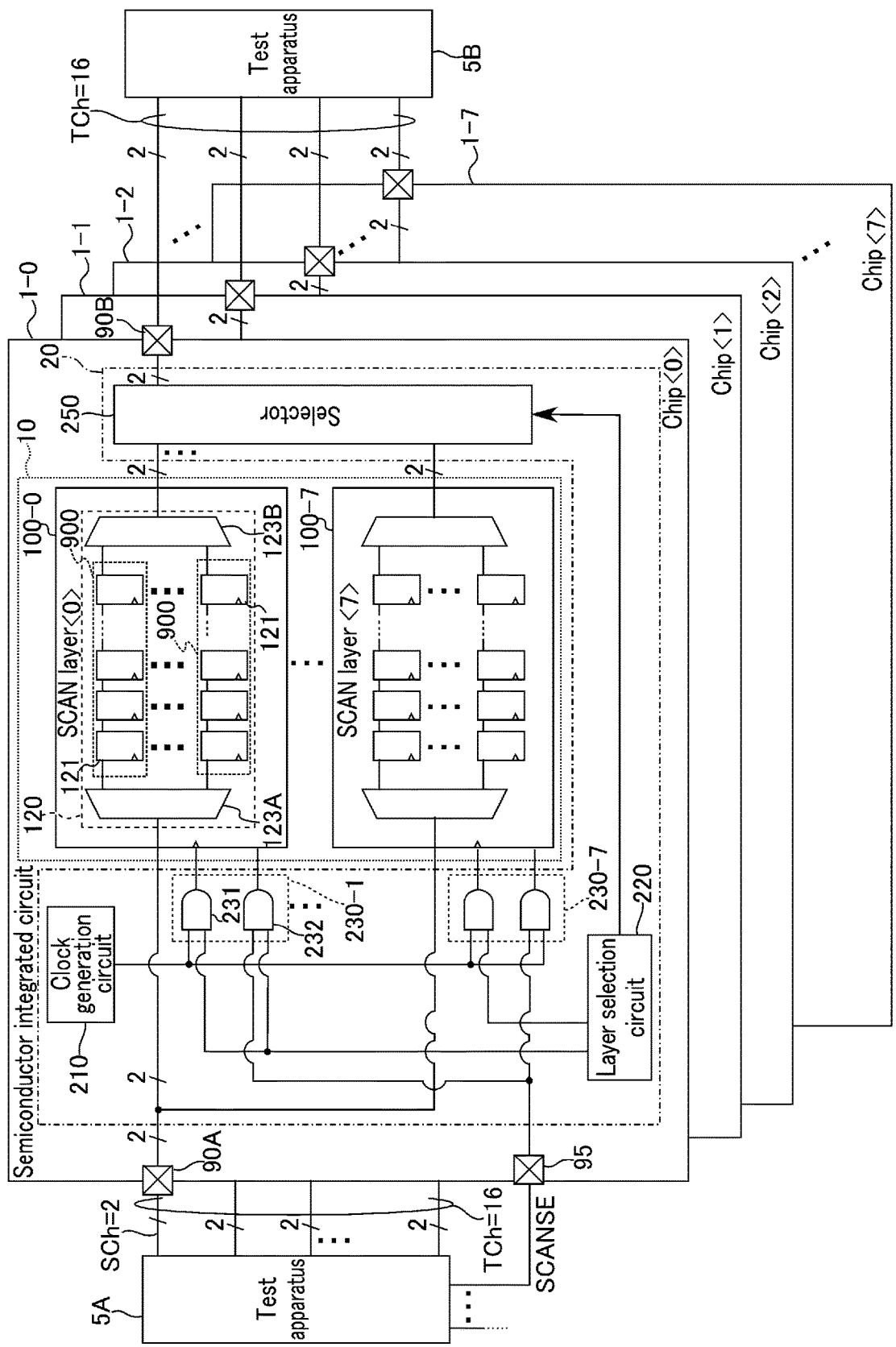
FIG. 5 is a schematic diagram for describing the test method for a semiconductor integrated circuit of the embodiment.

As shown in FIG. 5, the semiconductor integrated circuit 1 of the present embodiment is connected to test apparatuses 5 (5A and 5B). A test operation of the present embodiment is executed simultaneously (in parallel) on chips (chip <0>, chip <1>, chip <2>, . . . , chip <7>) of a plurality of semiconductor integrated circuits 1 (1-0, 1-1, 1-2 . . . , 1-7).

For example, in a case where the test apparatus 5 has 16 test channels TCh and each semiconductor integrated circuit 1 has two scan channels SCh, the test operation is executed simultaneously on eight semiconductor integrated circuits 1-0, . . . , 1-7. In this manner, p test channels of the test apparatus 5 are allocated to q semiconductor integrated circuits 1, i.e., "p/q" test channels per semiconductor integrated circuit 1, as scan channels SCh. p and q are each an integer of 2 or more.

The test apparatus 5 supplies an enable signal SCANSE regarding a scan test to each of the eight semiconductor integrated circuits 1-0, 1-1, . . . , 1-7. According to the start of the scan test, the signal level of the enable signal SCANSE is transitioned from the "L" level to the "H" level. Thereby, the test apparatus 5 starts the scan test on the semiconductor integrated circuits 1.

<S1>

Among the scan layers 100 included in each semiconductor integrated circuit 1 of a scan test target, an X-th scan layer (for example, a first scan layer) 100-0 is selected by the control by the layer selection circuit 220 and the mask control circuit 230. The remaining scan layers 100-1, . . . 100-7 are set to the mask state (non-selected state). X is an integer of 1 or more.

In the present embodiment, the scan test is executed simultaneously on a plurality of (for example, eight) semiconductor integrated circuits 1-0, 1-1, . . . , 1-7. Therefore, for the eight semiconductor integrated circuits 1, eight first scan layers 100-0 are selected as scan test targets. Various pieces of processing for the scan test in the test method for the semiconductor integrated circuit 1 of the present embodiment are executed simultaneously on selected scan layers of the semiconductor integrated circuits 1.

<S2>

In each semiconductor integrated circuit 1, a j-th piece of test data of a certain test pattern is supplied from the test apparatus 5A to the selected scan layer 100-0. In the selected scan layer 100-0, the test data is supplied to a scan flip-flop 121 in the scan chain circuit 120 by a shift operation based on a shift clock. j is an integer of 1 or more.

By the control by the layer selection circuit 220 and the mask control circuit 230, the test data is not supplied to a scan layer 100 in the mask state.

<S3>

In each semiconductor integrated circuit 1, the selected scan layer 100-0 is set to the waiting state in a state where the test data is held in the scan layer 100-0 by the control by the layer selection circuit 220 and the mask control circuit 230.

<S4>

After the scan layer 100-0 is set to the waiting state, in each semiconductor integrated circuit 1, a Y-th scan layer (for example, a second scan layer) 100-1 among the scan layers 100 is selected by the control by the layer selection circuit 220 and the mask control circuit 230. The remaining scan layers 100 are set to the mask state. Y is an integer of 1 or more different from the value of X.

<S5>

In each semiconductor integrated circuit 1, an h-th piece of test data of a certain test pattern is supplied from the test apparatus 5A to the selected Y-th scan layer 100-1 according to a shift operation. h is an integer of 1 or more. For example, the test pattern of the test data supplied to the Y-th scan layer 100-1 is different from the data pattern of the test data supplied to the X-th scan layer 100-0. However, the test pattern of the test data supplied to the Y-th scan layer 100-1 may be the same as the test pattern of the test data supplied to the X-th scan layer 100-0.

<S6>

After the supply of test data to the Y-th scan layer 100-1, in each semiconductor integrated circuit 1, the Y-th scan layer 100-1 is set to the waiting state.

In the period from when the Y-th scan layer 100-1 receives test data to when the Y-th scan layer 100-1 is set to the waiting state, the waiting state of the X-th scan layer 100-0 holding test data is maintained.

After that, in each semiconductor integrated circuit 1, test data is sequentially supplied to the remaining scan layers (for example, a third to an eighth scan layer) 100 set to the selected state like in the operations on the X-th and Y-th scan layers 100-0 and 100-1. The scan layers 100 supplied with test data are sequentially set to the waiting state.

<S7>

In each semiconductor integrated circuit 1, after a certain period of time has elapsed from when the X-th scan layer 100-0 (and the Y-th scan layer 100-1) was set to the waiting state (see, for example, FIG. 3), the waiting state of the X-th scan layer 100-0 is canceled by the control by the layer selection circuit 220 and the mask control circuit 230. The X-th scan layer 100-0 is set to the selected state again.

In each semiconductor integrated circuit 1, a launch clock and a capture clock are supplied to the X-th scan layer 100-0 after the waiting state. Thereby, a launch/capture operation is executed on the X-th scan layer 100-0 after the waiting state.

After the supply of a launch clock and a capture clock, a shift clock is supplied to the X-th scan layer 100-0. Thereby, a shift operation is executed on the X-th scan layer 100-0.

As a result, a result of the scan test with respect to test data in the X-th scan layer 100-0 after the waiting state is acquired by the shift operation. The result of the scan test of the X-th scan layer 100-0 is transferred to the test apparatus 5B via the selector 250. The presence or absence of a failure of the X-th scan layer 100-0 with respect to test data is verified by the test apparatuses 5 (5A and 5B).

In a case where there is test data to be supplied, new test data (a (j+1)-th piece of test data) of a certain test pattern is supplied to the selected X-th scan layer 100-0 by the shift operation together with (simultaneously with) acquisition of a result of the scan test.

<S8>

The X-th scan layer 100-0 supplied with new test data is set to the waiting state again.

<S9>

After the launch/capture operation and the shift operation on the X-th scan layer 100-0, in each semiconductor integrated circuit 1, the waiting state of the Y-th scan layer 100-1 is canceled by the control by the layer selection circuit 220 and the mask control circuit 230. The Y-th scan layer 100-1 is set to the selected state again.

A launch clock and a capture clock are supplied to the selected Y-th scan layer 100-1 of each semiconductor integrated circuit 1. Thereby, a launch/capture operation is executed on the Y-th scan layer 100-1 after the waiting state.

After the supply of a launch clock and a capture clock, a shift clock is supplied to the Y-th scan layer 100-1. Thereby, a shift operation is executed on the Y-th scan layer 100-1.

As a result, a result of the scan test with respect to test data in the Y-th scan layer 100-1 after the waiting state is acquired by the shift operation. The result of the scan test of the Y-th scan layer 100-1 is transferred to the test apparatus 5B via the selector 250. The presence or absence of a failure of the Y-th scan layer 100-1 with respect to test data is verified.

In a case where there is test data to be supplied, new test data of a certain test pattern is supplied to the selected Y-th scan layer 100-0 by a shift operation together with (simultaneously with) acquisition of a result of the scan test.

<S10>

The Y-th scan layer 100-1 supplied with new test data is set to the waiting state again.

After that, in each semiconductor integrated circuit 1, the waiting states of the remaining scan layers 100 are sequentially canceled like in the operations on the X-th and Y-th scan layers 100-0 and 100-1. Launch clocks, capture clocks, and shift clocks are sequentially supplied to scan layers 100 released from the waiting state. Thereby, test results with respect to test data are sequentially acquired from the scan layers 100 after the waiting state. Further, simultaneously with the acquisition of a test result, new test data can be supplied to each of the scan layers 100 after the waiting state.

<S11>

The test apparatus 5 (or the test control circuit 20) determines whether the scan test is ended or not. In a case where the test apparatus 5 determines that the scan test is not ended (in a case of NO of S11), the processing of S7 to S10 described above is repeatedly executed.

In a case where the test apparatus 5 determines that the scan test is ended (in a case of YES of S11), the scan test executed in parallel on the semiconductor integrated circuits 1 ends. For the semiconductor integrated circuits 1-0, 1-1, 1-2 . . . , 1-7 on which a scan test has been executed simultaneously, the presence or absence of a failure of the semiconductor integrated circuit 1 is determined by the test apparatus 5 based on a result of the scan test on the scan layers (all the scan layers) 100 in each semiconductor integrated circuit 1.

In the above manner, the test method for a semiconductor integrated circuit of the present embodiment ends.

In the test method for the semiconductor integrated circuit 1 of the present embodiment, a test operation is executed simultaneously on a plurality of semiconductor integrated circuits 1. Thereby, even in a case where the scan layer 100 is set to the waiting state in the period between a shift operation and a launch/capture operation, the test period of the set of semiconductor integrated circuits 1 is not increased. As a result, the semiconductor integrated circuit 1 and the test method for the semiconductor integrated circuit 1 of the present embodiment can avoid an increase in the cost of the test operation while improving the reliability of the test operation.

(3) Conclusions

In the semiconductor integrated circuit 1 of the present embodiment, a core circuit of a scan test target is divided into a plurality of layers (scan layers) 100.

In the present embodiment, various operations for a scan test are executed on a plurality of scan layers 100 independently of each other.

In a scan test of scan layers 100, a scan layer 100 of a test target is set to the waiting state in the period between a shift operation and a launch/capture operation.

Thereby, the semiconductor integrated circuit 1 and the test method therefor of the present embodiment can detect a failure (delay failure) that can occur during the period in which the scan flip-flop 121 and the combinational circuit 110 of the scan layer 100 hold data.

As a result, the semiconductor integrated circuit 1 and the test method therefor of the present embodiment can improve the reliability of the test of the semiconductor integrated circuit.

In the present embodiment, a scan test on the semiconductor integrated circuit 1 is executed on divided scan layers 100 independently of each other. Therefore, the semiconductor integrated circuit 1 and the test method therefor of the present embodiment can suppress the occurrence of a power supply drop as compared to a case where a scan test is executed on the entire core circuit at a time. As a result, the semiconductor integrated circuit 1 and the test method therefor of the present embodiment can stabilize the test operation, and can reduce the power consumption generated by the test operation.

Accordingly, the semiconductor integrated circuit 1 and the test method therefor of the present embodiment can enhance power control during the shift operation and during the launch/capture operation. Therefore, the semiconductor integrated circuit 1 and the test method therefor of the present embodiment can improve efficiency for test data patterns as compared to a general test method for a semiconductor integrated circuit. As a result, there is a possibility that the semiconductor integrated circuit 1 and the test method therefor of the present embodiment can reduce the cost of the test.

In the test method for the semiconductor integrated circuit 1 of the present embodiment, a scan test for each scan layer 100 is executed simultaneously on a plurality of semiconductor integrated circuits 1. Therefore, in the test method for the semiconductor integrated circuit 1 of the present embodiment, even in a case where a period in which a scan layer 100 is set to the waiting state is provided between a shift operation and a launch/capture operation in a scan test on the scan layer 100, an increase in the test time for the set of semiconductor integrated circuits 1 is suppressed. As a result, the test method for the semiconductor integrated circuit 1 of the present embodiment can avoid an increase in test cost.

As hereinabove, the semiconductor integrated circuit and the test method therefor of the present embodiment can improve the reliability of the test on the semiconductor integrated circuit.

(4) Others

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor integrated circuit comprising:
a core circuit including a first scan layer and a second scan layer, the first scan layer including a first scan chain circuit and a first combinational circuit, the second scan layer including a second scan chain circuit and a second combinational circuit; and
a test control circuit that controls a scan test on the first and second scan layers;
wherein
the test control circuit
supplies a first piece of test data and a first shift clock to the first scan layer and then sets the first scan layer to a waiting state,
supplies a second piece of test data and a second shift clock to the second scan layer during a period in which the first scan layer is in the waiting state,
sets the second scan layer to a waiting state after supplying the second piece of test data and the second shift clock to the second scan layer, and
supplies a first launch clock and a first capture clock to the first scan layer after setting the second scan layer to the waiting state.

2. The semiconductor integrated circuit according to claim 1, wherein
the test control circuit controls the first and second scan layers independently of each other in the scan test.

3. The semiconductor integrated circuit according to claim 1, wherein
the test control circuit
includes:
a layer selection circuit that outputs a selection signal for selecting the first scan layer or the second scan layer; and
a plurality of mask control circuits that are connected individually to the first and second scan layers and individually control mask states of the first and second scan layers based on the selection signal.

4. The semiconductor integrated circuit according to claim 3, wherein
each of the mask control circuits
includes a first AND gate that receives a clock and the selection signal, and
the first AND gate supplies the clock to a corresponding scan layer based on the selection signal.

5. The semiconductor integrated circuit according to claim 3, wherein
each of the mask control circuits
includes
a second AND gate that receives a control signal indicating execution of a test and the selection signal, and
the second AND gate controls the mask state of the corresponding scan layer based on the control signal and the selection signal.

6. The semiconductor integrated circuit according to claim 3, wherein
each of the mask control circuits blocks a signal for another scan layer than the corresponding scan layer from being inputted to the corresponding scan layer.

7. The semiconductor integrated circuit according to claim 3, wherein
the test control circuit
further includes:
a selector that, based on the selection signal, selects one of output data from the first scan layer and output data from the second scan layer.

8. The semiconductor integrated circuit according to claim 3, wherein
the test control circuit
further includes:
a clock generation circuit that generates a plurality of clocks for the scan test.

9. The semiconductor integrated circuit according to claim 1, wherein
the core circuit is divided into the first and second scan layers according to a clock system, a number of circuit elements, an area of a circuit, and a function of a circuit.

10. The semiconductor integrated circuit according to claim 1, wherein
the scan test is executed on each of the first and second scan layer in a time division manner.

11. A test method for a semiconductor integrated circuit, comprising:
supplying a first piece of test data and a first shift clock to a first scan layer in a first semiconductor chip, the first semiconductor chip including a first core circuit and a first test control circuit, the first core circuit including the first scan layer and a second scan layer, the first scan layer including a first combinational circuit and a first scan chain circuit, the second scan layer including a second combinational circuit and a second scan chain circuit, the first test control circuit being configured to execute a scan test on the first and second scan layers;
setting the first scan layer to a waiting state after supplying the first piece of test data and the first shift clock to the first scan layer;
supplying a second piece of test data and a second shift clock to the second scan layer during a period in which the first scan layer is set to the waiting state;
setting the second scan layer to a waiting state after supplying the second piece of test data and the second shift clock to the second scan layer; and
supplying a first launch clock and a first capture clock to the first scan layer during a period in which the second scan layer is set to the waiting state.

12. The test method for a semiconductor integrated circuit according to claim 11, further comprising:

supplying a second launch clock and a second capture clock to the second scan layer after the first launch clock and the first capture clock are supplied to the first scan layer, and determining presence or absence of a failure of the first semiconductor chip based on output data from the first scan layer according to the first capture clock and output data from the second scan layer according to the second capture clock.

13. The test method for a semiconductor integrated circuit according to claim 11, further comprising:

supplying the first piece of test data and a third shift clock to a third scan layer in a second semiconductor chip simultaneously with supply of the first piece of test data and the first shift clock to the first scan layer, the second semiconductor chip including a second core circuit and a second test circuit, the second core circuit including the third scan layer and a fourth scan layer, the third scan layer including a third combinational circuit and a third scan chain circuit, the fourth scan layer including a fourth combinational circuit and a fourth scan chain circuit, the second test circuit being configured to execute the scan test on the third and fourth scan layers, setting the third scan layer to a waiting state simultaneously with setting of the first scan layer to the waiting state after the first piece of test data and the third shift clock are supplied to the third scan layer, supplying the second piece of test data and a fourth shift clock to the fourth scan layer simultaneously with supply of the second piece of test data and the second shift clock to the second scan layer during a period in which the first and third scan layers are set to the waiting state, setting the fourth scan layer to a waiting state simultaneously with setting of the second scan layer to the waiting state after the second piece of test data and the fourth shift clock are supplied to the fourth scan layer, supplying a second launch clock and a second capture clock to the third scan layer simultaneously with supply of the first launch clock and the first capture clock to the first scan layer during a period in which the second and fourth scan layers are set to the waiting state, supplying a third launch clock and a third capture clock to the second scan layer and supplying a fourth launch clock and a fourth capture clock to the fourth scan layer after the first and second launch clocks and the first and second capture clocks are supplied to the first and third scan layers, and determining presence or absence of failures of the first and second semiconductor chips based on output data from the first scan layer according to the first capture clock, output data from the second scan layer according to the third capture clock, output data from the third scan layer according to the second capture clock, and output data from the fourth scan layer according to the fourth capture clock.

14. The test method for a semiconductor integrated circuit according to claim 11, wherein
the first and second scan layers are controlled independently of each other.

15. The test method for a semiconductor integrated circuit according to claim 11, wherein
the first and second scan layers are selected based on a selection signal outputted from the test control circuit.

16. The test method for a semiconductor integrated circuit according to claim 15, wherein
mask states of the first and second scan layers are controlled based on the selection signal.

17. The test method for a semiconductor integrated circuit according to claim 15, wherein
a signal indicating a result of an AND operation of a clock and the selection signal is supplied to a scan layer selected from the first and second scan layers.

18. The test method for a semiconductor integrated circuit according to claim 15, wherein
mask states of the first and second scan layers are controlled based on a result of an AND operation of a control signal indicating execution of a test and the selection signal.

19. The test method for a semiconductor integrated circuit according to claim 11, wherein
the core circuit is divided into the first and second scan layers according to a clock system, a number of circuit elements, an area of a circuit, and a function of a circuit.

20. The test method for a semiconductor integrated circuit according to claim 11, wherein
the scan test is executed on each of the first and second scan layer in a time division manner.

* * * * *